United States Patent
Taguchi et al.

(10) Patent No.: US 10,361,412 B2
(45) Date of Patent: Jul. 23, 2019

(54) METHOD AND APPARATUS FOR FORMING THIN-BOARD-LIKE BASE MATERIAL

(71) Applicant: Nissan Motor Co., Ltd., Yokohama-shi, Kanagawa (JP)

(72) Inventors: Naoto Taguchi, Matsudo (JP); Masaaki Yoshitome, Sagamihara (JP); Manabu Higuchi, Hino (JP)

(73) Assignee: Nissan Motor Co., Ltd., Yokohama (JP)

( * ) Notice: Subject to any disclaimer, the term of this patent is extended or adjusted under 35 U.S.C. 154(b) by 77 days.

(21) Appl. No.: 14/766,833

(22) PCT Filed: Dec. 26, 2013

(86) PCT No.: PCT/JP2013/084999
§ 371 (c)(1),
(2) Date: Aug. 10, 2015

(87) PCT Pub. No.: WO2014/132543
PCT Pub. Date: Sep. 4, 2014

(65) Prior Publication Data
US 2015/0380701 A1    Dec. 31, 2015

(30) Foreign Application Priority Data
Feb. 26, 2013 (JP) .................. 2013-035885

(51) Int. Cl.
*H01M 2/14* (2006.01)
*B21D 43/11* (2006.01)
(Continued)

(52) U.S. Cl.
CPC .......... *H01M 2/145* (2013.01); *B21D 19/043* (2013.01); *B21D 28/06* (2013.01); *B21D 43/06* (2013.01);
(Continued)

(58) Field of Classification Search
CPC ...... H01M 2/145; H01M 2/18; H01M 8/0202; B21D 19/043; B21D 28/06; B21D 43/06; B21D 43/11
(Continued)

(56) References Cited

U.S. PATENT DOCUMENTS 2,786,399 A * 3/1957 Mason ................. B31D 5/0082
  210/442
2,923,966 A * 2/1960 Tooke et al. .......... B29C 55/165
  26/73
(Continued)

FOREIGN PATENT DOCUMENTS

CN    1264333 A    8/2000
JP    57-183126 U    11/1982
(Continued)

*Primary Examiner* — Sameh Tawfik
(74) *Attorney, Agent, or Firm* — Global IP Counselors, LLP

(57) ABSTRACT

A method for forming a thin, board-like base material has a tensile transfer step and a forming step. In the tensile transfer step, the long, thin, board-like base material is transferred by pulling the thin, board-like base material in the transfer direction while holding both ends of the thin, board-like base material along the transfer direction and pulling the ends outward in the direction intersecting the transfer direction. In the forming step, predetermined forming operations are performed with respect to the thin, board-like base material.

2 Claims, 10 Drawing Sheets

(51) Int. Cl.
*B21D 19/04* (2006.01)
*B21D 43/06* (2006.01)
*H01M 2/18* (2006.01)
*B21D 28/06* (2006.01)
*H01M 8/0202* (2016.01)

(52) U.S. Cl.
CPC ............... *B21D 43/11* (2013.01); *H01M 2/18* (2013.01); *H01M 8/0202* (2013.01)

(58) Field of Classification Search
USPC .......................................................... 493/467
See application file for complete search history.

(56) References Cited

U.S. PATENT DOCUMENTS

| | | | | |
|---|---|---|---|---|
| 3,034,409 | A * | 5/1962 | Finke | B31B 19/00 493/226 |
| 3,240,412 | A * | 3/1966 | Zygan | B21D 1/00 226/173 |
| 3,256,558 | A * | 6/1966 | Heinz-Erhardt | B29C 55/165 226/172 |
| 3,286,817 | A * | 11/1966 | Brigham | 198/626.5 |
| 3,398,871 | A * | 8/1968 | Ungerer | B21D 43/023 226/173 |
| 3,503,109 | A | 3/1970 | Krall | |
| 3,529,332 | A * | 9/1970 | Hyatt | B29C 55/20 26/91 |
| 3,881,229 | A * | 5/1975 | Reid | D06C 3/025 226/173 |
| 3,931,881 | A * | 1/1976 | Bickel | B29C 70/24 156/543 |
| 4,426,343 | A * | 1/1984 | Vittone | B29C 55/08 264/136 |
| 4,574,999 | A * | 3/1986 | Vossen | B65D 5/42 220/657 |
| 4,643,129 | A * | 2/1987 | Sari | B65G 37/005 118/500 |
| 4,710,158 | A * | 12/1987 | Knipp | B26F 3/002 225/2 |
| 4,726,210 | A | 2/1988 | Weil et al. | |
| 4,929,976 | A * | 5/1990 | Cunningham | G03D 3/135 226/170 |
| 5,419,793 | A * | 5/1995 | Brudermann | B29C 53/36 156/202 |
| 5,559,575 | A * | 9/1996 | King | G03D 3/135 226/172 |
| 5,800,329 | A * | 9/1998 | Fager | B31B 50/00 493/417 |
| 5,997,459 | A * | 12/1999 | Kruger | B31F 1/0022 493/161 |
| 6,170,733 | B1 * | 1/2001 | Fritz, Sr. | B23K 3/0676 198/626.6 |
| 6,451,447 | B1 | 9/2002 | Ragland et al. | |
| 6,722,104 | B1 * | 4/2004 | Haggman | B31B 17/00 53/412 |
| 7,093,333 | B2 * | 8/2006 | Lee | D06C 3/025 26/89 |
| 7,544,159 | B2 * | 6/2009 | Petratto | B31F 1/0009 493/356 |
| 2007/0095001 | A1 | 5/2007 | Heatherington | |
| 2013/0296152 | A1 * | 11/2013 | Murakami | A61F 13/15747 493/405 |

FOREIGN PATENT DOCUMENTS

| | | |
|---|---|---|
| JP | 58-116126 U | 8/1983 |
| JP | 2007-42592 A | 2/2007 |
| JP | 2008-204952 A | 9/2008 |
| JP | 2012-227132 A | 11/2012 |

\* cited by examiner

10,361,412 B2

METHOD AND APPARATUS FOR FORMING THIN-BOARD-LIKE BASE MATERIAL

CROSS-REFERENCE TO RELATED APPLICATIONS

This application is a U.S. National stage application of International Application No. PCT/JP2014/084999, filed Dec. 26, 2013, which claims priority to Japanese, which claims priority to Japanese No. 2013-035885 filed in Japan on Feb. 26, 2013, the contents of each of which is hereby incorporated herein by reference.

BACKGROUND

Field of the Invention

The present invention relates to a method for forming a thin, board-like base material and a forming apparatus embodying the forming method.

Background Information

Conventionally, for example, a fuel cell is configured by alternately laminating a separator and a membrane electrode assembly. Since, in a fuel cell, high output can be obtained in accordance with the number of laminations of the separators and the membrane electrode assemblies, increasing the number of laminations is desirable.

A separator is formed by transferring a long, thin, board-like base material while forming irregularities, through-holes, and the like on the thin, board-like base material, using a forming apparatus comprising a plurality of press machines, after which the area is punched to become the formed article. That is, a separator is produced in a continuous fashion by punching after forming irregularities, through-holes, and the like on a thin, board-like base material at regular intervals (for example, refer to Japanese Laid-Open Patent Application No. 2012-227132). Therefore, the productivity of the separators can be improved if a thin, board-like base material can be transferred at a high speed.

SUMMARY

Since a thin, board-like base material has a thin plate thickness and is not equipped with sufficient rigidity, transfer at a high speed would generate distortion as a result of excessive stretching in the transfer direction, contributing to the fear that forming accuracy cannot be maintained. If the productivity of the separators cannot be improved by transferring a thin, board-like base material at a high speed, a higher number of forming apparatuses must be used in order to secure the required number of separators.

In order to achieve the above-described objective, the present invention provides a forming method whereby the time needed to form a thin, board-like base material is shortened while maintaining the forming accuracy of the thin, board-like base material; additionally, the productivity related to the formation of the thin, board-like base material can be improved, along with a forming apparatus embodying the forming method.

The method of forming the thin, board-like base material of the present invention, which achieves the above objective, has a tensile transfer step and a forming step. In the tensile transfer step, the long, thin, board-like base material is transferred by pulling the thin, board-like base material in the transfer direction while holding both ends of the thin, board-like base material along the transfer direction and pulling the ends outward in the direction intersecting the transfer direction. In the forming step, predetermined forming operations are performed with respect to the thin, board-like base material. The method further comprises a grip forming step for forming grip portions by processing each of the two ends of the thin, board-like base material during transfer along the transfer direction. In the tensile transfer step, the grip portions of the thin, board-like base material are held and pulled outward in the direction intersecting the transfer direction.

The apparatus to form the thin, board-like base material of the present invention, which achieves the above objective, comprises a tension unit, a transfer unit, a forming unit, and a control unit. The tension unit holds both ends of the long, thin, board-like base material along the transfer direction with a first grip portion and a second grip portion and pulls the thin, board-like base material outward in the direction intersecting the transfer direction. The transfer unit transfers the thin, board-like base material, which is in a state of being pulled by the tension unit outward in the direction intersecting the transfer direction, by pulling the thin, board-like base material in the transfer direction. The forming unit performs predetermined forming operations with respect to the thin, board-like base material. The control unit controls the operation of the tension unit, the transfer unit, and the forming unit. The apparatus further comprises a grip forming unit that forms grip portions by processing both ends of the thin, board-like base material along the transfer direction based on a control of the control unit. The tension unit clamps and pulls the grip portions of the thin, board-like base material.

BRIEF DESCRIPTION OF THE DRAWINGS

Referring now to the attached drawings which form a part of this original disclosure.

DETAILED DESCRIPTION OF THE EMBODIMENTS

Figure 1:
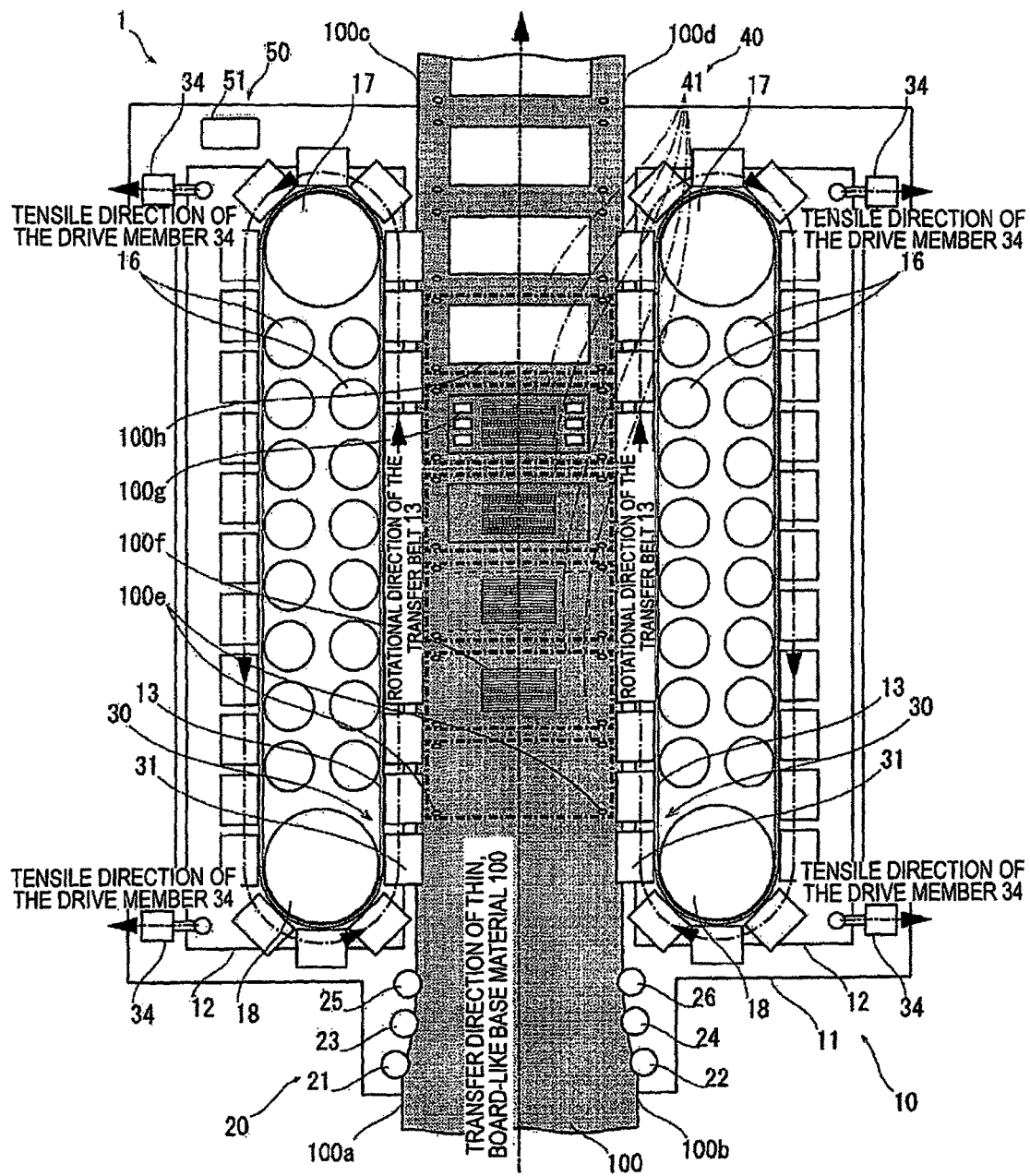
FIG. 1 is an upper surface view illustrating the principle part of the forming apparatus of the thin, board-like base material according to a first embodiment.

The first and the second embodiments will be explained below, with reference to the appended drawings. In the explanations of the drawings, the same elements have been given the same reference codes, and the overlapping explanations have been omitted. The sizes and ratios of the members in the drawing have been exaggerated for the convenience of the explanation, and they may be different than the actual sizes and ratios.

First Embodiment

The method of forming the thin, board-like base material 100 according to the first embodiment and the forming apparatus 1 of the thin, board-like base material 100 embodying the forming method will be explained with reference to FIG. 1 to FIGS. 9A and 9B.

First, the configuration of the forming apparatus 1 of the thin, board-like base material 100 will be explained with reference to FIG. 1 to FIGS. 4A and 4B.

Figure 2A:
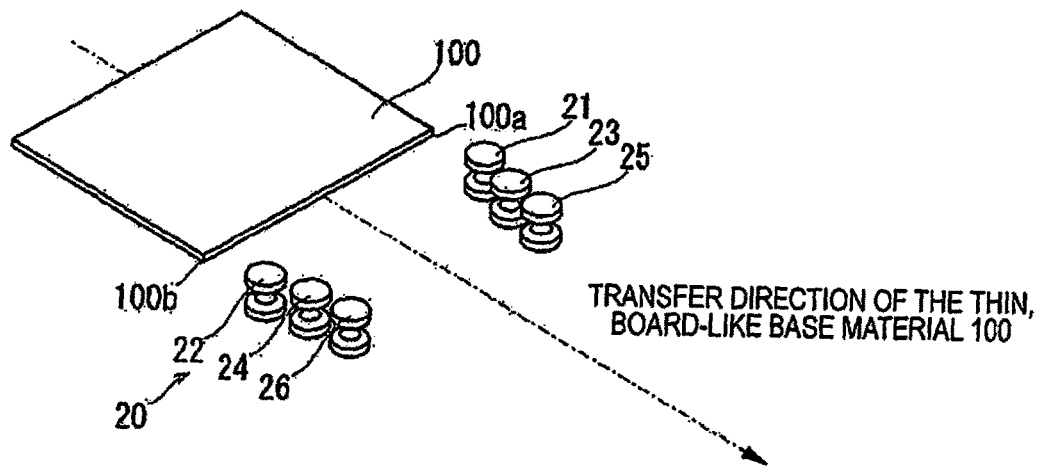
FIGS. 2A-2C are perspective views schematically illustrating a state in which curl forming is performed on both ends of a thin, board-like base material during transfer, using a grip forming unit of the forming apparatus.
Figure 2B:
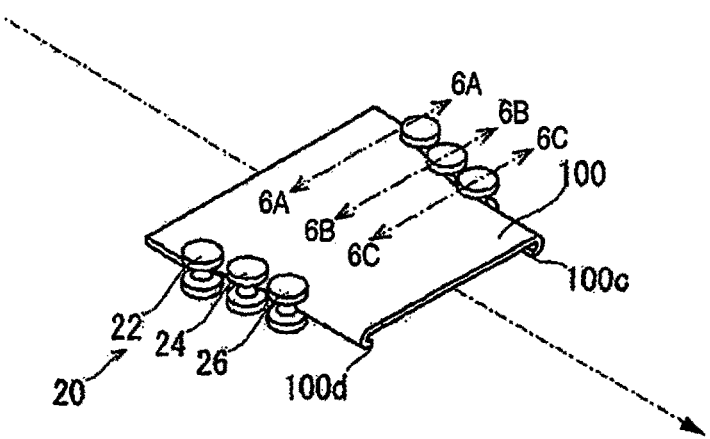
Figure 2C:
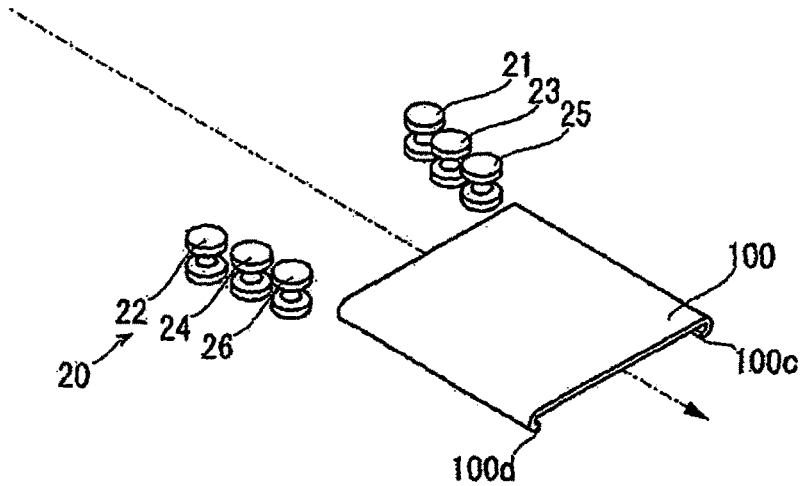
Figure 3A:
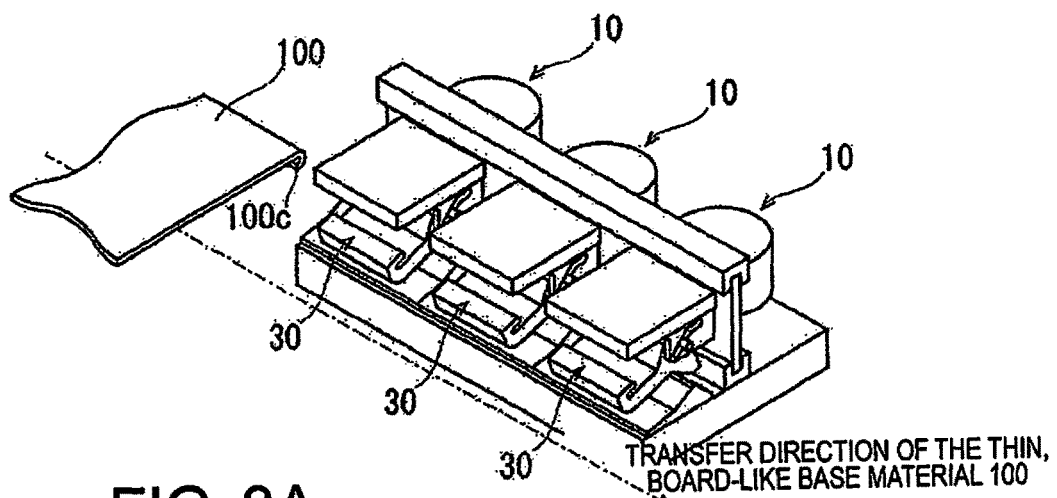
FIGS. 3A-3C are perspective views schematically illustrating a state in which both ends of a thin, board-like base material, which is curl formed and being transferred, are each pulled outward using the tension unit of the forming apparatus.
Figure 3B:
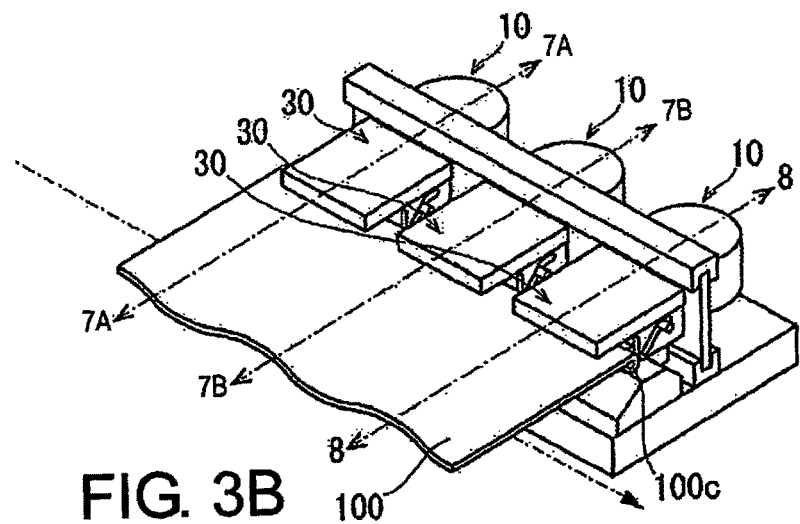
Figure 3C:
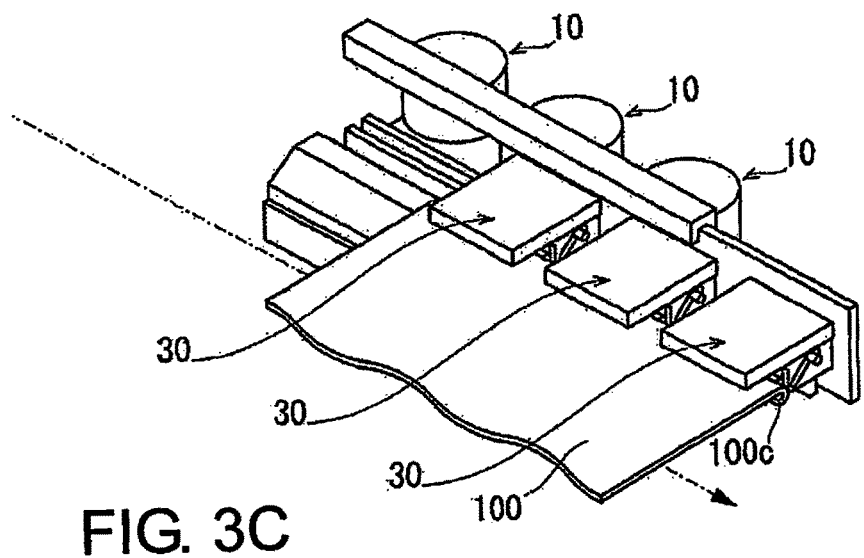
Figure 4A:
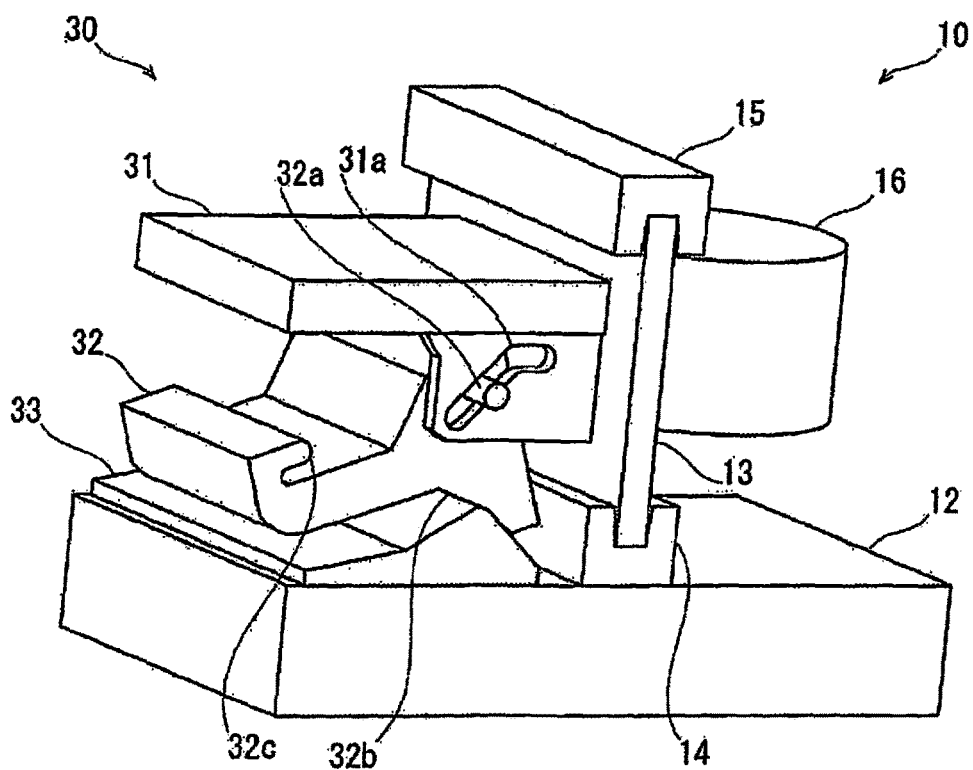
FIGS. 4A and 4B are perspective views illustrating the principle parts of the tension unit and the transfer unit of the forming apparatus.
Figure 4B:
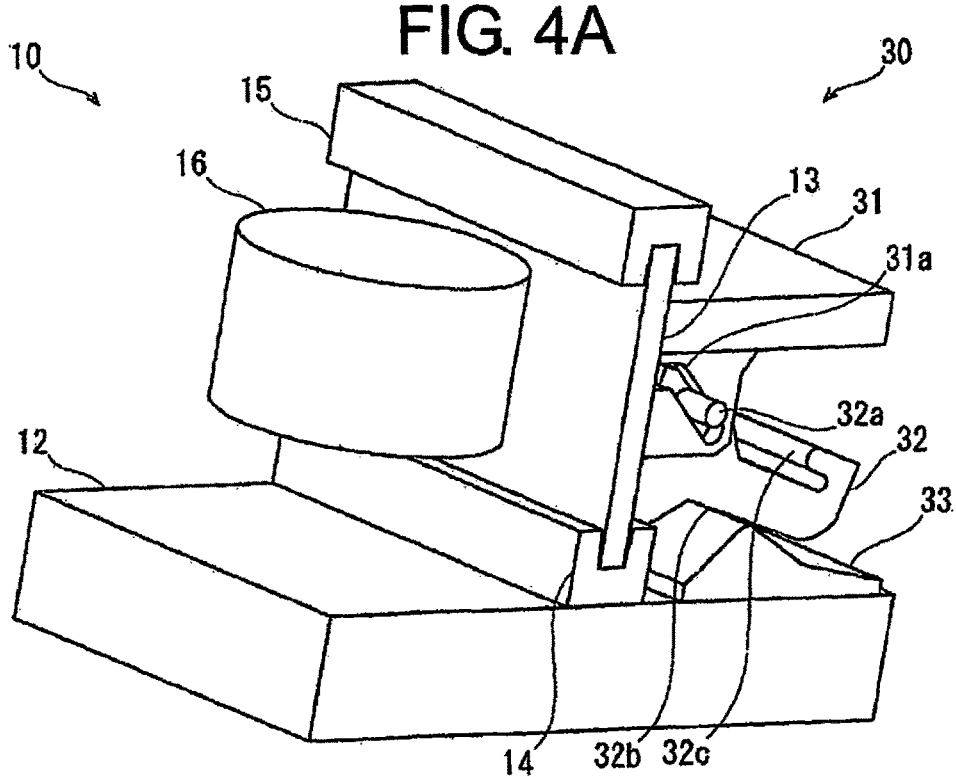

FIG. 1 is an upper surface view illustrating the principle part of the forming apparatus 1 of the thin, board-like base material 100. FIGS. 2A-2C are perspective views schematically illustrating a state in which curl forming is performed on both ends (one end 100a and the other end 100b) of a thin, board-like base material during transfer, using a grip forming unit 20 of the forming apparatus 1. FIGS. 3A-3C are perspective views schematically illustrating a state in which the grip portions (the one end 100c and the other end 100d) of the thin, board-like base material 100, which is curl formed and being transferred, are each pulled outward using a tension unit 30 of the forming apparatus 1. FIGS. 4A and 4B are perspective views illustrating the principle parts of the tension unit 30 and the transfer unit 10 of the forming apparatus 1.

The forming apparatus 1 comprises a transfer unit 10, a grip forming unit 20, a tension unit 30, a forming unit 40, and a control unit 50. Each configuration of the forming apparatus 1 will be explained in order below.

The transfer unit 10 transfers the thin, board-like base material 100, which is in a state of being pulled by the tension unit 30 described below outwards in the direction intersecting the transfer direction, by pulling the thin, board-like base material in the transfer direction, as illustrated in FIG. 1.

The transfer unit 10 comprises a mounting table 11, a reference table 12, a transfer belt 13, a lower rail 14, an upper rail 15, backup rollers 16, a drive roller 17, and a driven roller 18. The components of the transfer unit 10, the grip forming unit 20, and the tension unit 30 are all mounted on the mounting table 11. The mounting table 11 is made of, for example, metal and is formed in a plate shape. The reference table 12 is provided along each of the two ends of the thin, board-like base material 100 to be transferred, on top of the mounting table 11. The components of the transfer unit 10 and the components of the tension unit 30, except for the drive member 34, are all disposed on the reference table 12. The reference table 12 is made of, for example, metal and is formed in a plate shape.

The transfer belt 13 is provided on the reference table 12 in a state of being pressed from the inside by the drive roller 17 and the driven roller 18 described below, as illustrated in FIG. 1. The transfer belt 13 is made of, for example, rubber and is formed in an endless shape. The transfer belt 13 joins a plurality of first grip members 31 of the tension unit 30 described below at set intervals, as illustrated in FIGS. 4A and 4B.

The lower rail 14 and the upper rail 15 are provided to the reference table 12, as illustrated in FIGS. 4A and 4B. The drawings of the lower rail 14 and the upper rail 15 have been omitted in FIG. 1. The lower rail 14 and the upper rail 15 are made of, for example, metal and are formed in an annular shape comprising a recess. The transfer belt 13 is inserted in the recess of the mutually opposed lower rail 14 and the upper rail 15. The transfer belt 13 is held from above and below using the upper rail 15 and the lower rail 14. The backup rollers 16 are disposed at set intervals along the inner peripheral surface of the transfer belt 13 on the reference table 12, as illustrated in FIG. 1. The backup rollers 16 are made of, for example, rubber members and are formed in a cylindrical shape. The backup rollers 16 are rotated following the transfer belt 13.

The drive roller 17 and the driven roller 18 are provided on the reference table 12 to one end and to the other end of the inner peripheral surface of the transfer belt 13, in a state of pressing the transfer belt 13 from the inside, as illustrated in FIG. 1 The drive roller 17 is rotated based on the control of the control unit 50 described below. The driven roller 18 is rotated following the transfer belt 13, which is rotated by the driven roller 17.

The grip forming unit 20 forms grip portions (one end 100c and the other end 100d) by processing both ends of the thin, board-like base material 100 along the transfer direction, based on the control of the control unit 50, as illustrated in FIG. 1 and FIGS. 2A-2C.

The grip forming unit 20 comprises curl rollers 21-26. The curl rollers 21-26 are rotatably disposed on the mounting table 11 of the transfer unit 10, on the upstream side of the transfer direction of the thin, board-like base material 100, as illustrated in FIG. 1. The curl rollers 21-26 have the same configuration, as illustrated in FIGS. 2A-2C. Specifically, the curl rollers 21-26 are made of, for example, a metal that is harder than the thin, board-like base material 100, and they are configured to have a cylindrical shape in which the center portion of the outer peripheral surface is bent in a concave shape.

The curl rollers 21 and 22 are provided to oppose both ends of the thin, board-like base material 100 in a direction intersecting the transfer direction, so as to abut the thin, board-like base material 100 during transfer, as illustrated in FIG. 1 and FIGS. 2A-2C. The curl rollers 23 and 24 are provided further on the downstream side in the transfer direction of the thin, board-like base material 100 than the curl rollers 21 and 22 to oppose both ends of the thin, board-like base material 100 in a direction intersecting the transfer direction, so as to intrude with respect to both ends of the thin, board-like base material 100 during transfer. The interval between the curl roller 23 and the curl roller 24 is shorter than the interval between the curl roller 21 and the curl roller 22. The curl rollers 25 and 26 are provided further on the downstream side in the transfer direction of the thin, board-like base material 100 than the curl rollers 23 and 24 to oppose both ends of the thin, board-like base material 100 in a direction intersecting the transfer direction and to further intrude with respect to both ends of the thin, board-like base material 100 during transfer. The interval between the curl roller 25 and the curl roller 26 is shorter than the interval between the curl roller 23 and the curl roller 24.

The curl rollers 21-26 form the two ends (one end 100a and the other end 100b) of the thin, board-like base material 100 into a curled shape using the center portion of the outer peripheral surface; each end is bent in a concave shape, as illustrated in FIGS. 2A-2C. FIG. 2A illustrates a state immediately before loading the thin, board-like base material 100 with respect to the curl rollers 21-26. As illustrated in FIG. 2B, the thin, board-like base material 100 is loaded with respect to the curl rollers 21-26 to curl form both ends (one end 100a and the other end 100b) of the thin, board-like base material 100. As illustrated in FIG. 2C, the thin, board-like base material 100, to which grip portions (one end 100c and the other end 100d) have been formed via curl forming, is unloaded from the curl rollers 21-26. The one end 100c and the other end 100d of the thin, board-like base material 100 correspond to the grip portions.

The tension unit 30 holds the grip portions (one end 100c and the other end 100d) on both ends of the long, thin, board-like base material 100 along the transfer direction with a first grip member 31 and a second grip member 32 and pulls the thin, board-like base material outward in the direction intersecting the transfer direction, as illustrated in FIG. 1, FIGS. 3A-3C, and FIGS. 4A and 4B.

In the tension unit 30, FIG. 3A illustrates a state before loading the thin, board-like base material 100 with respect to the tension unit 30. FIG. 3B illustrates a state in which the thin, board-like base material 100 is loaded with respect to the tension unit 30, and the grip portions (one end 100c and the other end 100d) of the thin, board-like base material 100 are held by the tension unit 30. FIG. 3C illustrates a state of transferring the thin, board-like base material 100, the grip portions (one end 100c and the other end 100d) of which are held by the tension unit 30. FIG. 4A illustrates the principle parts of the tension unit 30 and the transfer unit 10, as viewed from the inside of the forming apparatus 1 and the transfer area side of the thin, board-like base material 100. FIG. 4B illustrates the principal parts of the tension unit 30 and the transfer unit 10 from the outside of the forming apparatus 1.

The tension unit 30 comprises a first grip member 31, a second grip member 32, a guide member 33, and a drive member 34, as illustrated in FIGS. 4A and 4B. The first grip member 31 and the second grip member 32, when paired, correspond to a gripper, which holds the ends of the thin, board-like base material 100 during transfer, as illustrated in FIGS. 3A-3C. A plurality of first grip members 31 and second grip members 32 are joined at set intervals with respect to the outer peripheral surface of the transfer belt 13 of the transfer unit 10. The first grip member 31 and the second grip member 32 are positioned along both ends of the thin, board-like base material 100 in the transfer direction, as illustrated in FIG. 1 and FIGS. 3A-3C. The first grip member 31 is positioned relatively upward, and the second grip member 32 is positioned relatively downward at both ends of the thin, board-like base material 100 in the transfer direction, which is transferred in a horizontal state.

The first grip member 31 forms a pair with the second grip member 32 and holds the ends of the thin, board-like base material 100 during transfer, as illustrated in FIGS. 4A and 4B. A plurality of first grip members 31 are joined at set intervals with respect to the outer peripheral surface of the transfer belt 13 of the transfer belt 10. The first grip member 31 is made of, for example, metal and is formed in a U-shape with the opening facing downwards. A guide hole 31a comprising a through-hole is provided to the side surface of the first grip member 31. The guide hole 31 is formed in a bow shape comprising a bent portion. A guide pin 32a of the second grip member 32 is movably inserted into the guide hole 31a to guide the operation of the second grip member 32.

The second gear member 32 is coupled to the first grip member 31 and holds the ends of the thin, board-like base material 100 during transfer, as illustrated in FIG. 4. The second grip member 32 is made of, for example, metal and is formed in a rectangular shape comprising irregularities. The second grip member 32 movably inserts cylindrical guide pins 32a, which are provided projecting from both ends of the side surface, into the guide hole 31a in the lower portion of the first grip member 31.

The second grip member 32 comprises a smooth guide surface 32b on the bottom. The guide surface 32b of the second grip member 32 is biased to a guide member 33 whose shape is continuously changed along the transfer direction of the thin, board-like base material 100. When biased to the guide member 33 the guide surface 32b of the second grip member 32 is moved in the vertical direction, with respect to the transfer direction of the thin, board-like base material 100, and in a direction perpendicular to the transfer direction of the thin, board-like base material 100. The guide surface 32b of the second grip member 32 is freely rotatable about the guide pin 32a, which moves along the guide hole 31a of the first grip member 31, as the axis. The second grip member 32 comprises a projection 32a on the distal end opposing the thin, board-like base material 100. The projection 32c is provided along the transfer direction of the thin, board-like base material 100. The projection 32c of the second grip member holds the grip portions (one end 100c and the other end 100d) of the thin, board-like base material 100.

The guide member 33 moves the second grip member 32 closer to or away from the first grip member 31 by biasing the second grip member 32, as illustrated in FIG. 4. The guide member 33 corresponds to a co-called cam, having a shape that is continuously varied along the transfer direction of the thin, board-like base material 100. The guide member 33 is bonded to the reference table 12 of the transfer unit 10. The guide member 33 is made of, for example, metal and is formed in an elongated shape with a smooth upper surface. The long guide member 33 is bonded to the reference table 12 so as to be positioned on both ends of the thin, board-like base material 100 along the transfer direction. The guide member 32b of the second gear member 32 is abutted with the upper surface of the guide member 33.

The guide member 33 causes the second grip member 32 to move closer to or away from the first grip member 31 by continuously varying the upper surface thereof along the transfer direction of the thin, board-like base material 100. If the position of the upper surface of the guide member 33 is continuously raised along the transfer direction of the thin, board-like base material 100, the second grip member 32 gradually moves closer to the first grip member 31. On the other hand, if the position of the upper surface of the guide member 33 is continuously lowered along the transfer direction of the thin, board-like base material 100, the second grip member 32 gradually moves away from the first grip member 31.

If the position of the upper surface of the guide member 33 is continuously projected outward from the thin, board-like base material 100, perpendicular to the transfer direction of the thin, board-like base material 100, the projection 32c of the second grip member 32 will be in a state of being pressed against the first grip member 31 via the thin, board-like base material 100. At this time, the projection 32c of the second grip member 32 will be in a state of holding and pulling the grip portions (one end 100c and the other end 100d) of the thin, board-like base material 100. On the other hand, if the position of the upper surface of the guide member 33 is continuously retracted inward of the thin, board-like base material 100, perpendicular to the transfer direction of the thin, board-like base material 100, the projection 32c of the second grip member 32 will be separated from the first grip member 31. At this time, the projection 32c of the second grip member 32 will be in a state of releasing the grip portions (one end 100c and the other end 100d) of the thin, board-like base material 100.

The drive members 34 are disposed, for example, at each of the four corners of the mounting table 4, as illustrated in FIG. 1 The drive member 34 includes, for example, a hydraulic cylinder. The reference table 12 is pulled in a direction perpendicular to the transfer direction of the thin, board-like base material 100, outward and away from the thin, board-like base material 100, using the drive members 34. Since the reference table 12 is provided along both ends of the thin, board-like base material 100, the drive member 34 is configured to pull the thin, board-like base material 100 outward from both directions that are perpendicular to the transfer direction. In the forming apparatus 1, unlike the forming apparatus 2 according to the second embodiment described below, the drive members 34 are not necessary. That is, in the forming apparatus 1, the thin, board-like base material 100 can be pulled outward of the transfer direction by biasing the second grip member 32 outward of the transfer direction using the guide member 33.

The forming unit 40 performs predetermined forming operations with respect to the thin, board-like base material 100, as illustrated in FIG. 1.

In the forming unit 40, a plurality of press machines 41 are disposed above the thin, board-like base material 100 along the transfer direction of the thin, board-like base material 100. A common press machine 41 is used when forming irregularities, through-holes, etc., on the thin, board-like base material 100. Therefore, the press machine 41 is illustrated schematically in FIG. 1. Locating holes 100e for positioning, an irregular flow path 100f in the active area, and manifold holes 100g, which supply and discharge gas and cooling water, are formed on the thin, board-like base material 100 using the press machine 41. Then, the press machine 41 opens the punching holes 100h by punching the portion that becomes the separator.

The control unit 50 controls the operations of the transfer unit 10, the grip forming unit 20, the tension unit 30, and the forming unit 40.

The control unit 50 comprises a controller 51, as illustrated in FIG. 1. The controller 51 is disposed on the mounting table 11 of the transfer unit 10. The controller 51 is configured from a ROM, a CPU, a RAM, etc. The ROM (Read Only Memory) stores a control program related to the processing of the thin, board-like base material 100 by the forming apparatus 1. The CPU (Central Processing Unit) controls the operations of the transfer unit 10, the grip forming unit 20, the tension unit 30, and the forming unit 40, based on a control program. The RAM (Random Access Memory) temporarily stores various information regarding the thin, board-like base material 100 during processing by the forming apparatus 1.

Next, the method of forming the thin, board-like base material 100 using the forming apparatus 1 will be explained, with reference to FIG. 5 to FIGS. 9A and 9B.

Figure 5:
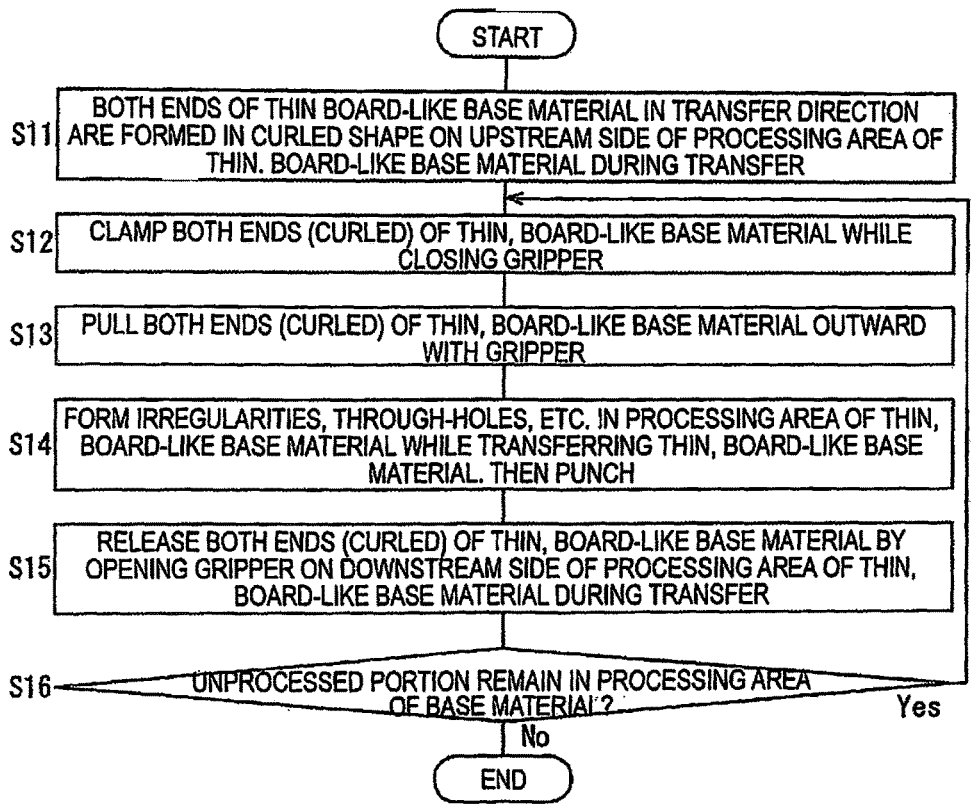
FIG. 5 is a flowchart illustrating the operation of forming a thin, board-like base material during transfer using the forming apparatus.
Figure 6A:
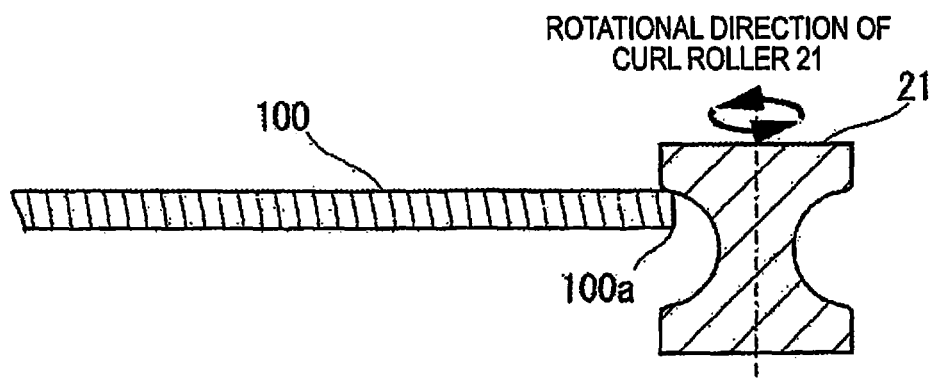
FIGS. 6A-6C are cross-sectional views corresponding to S11 in FIG. 5, illustrating a state in which curl forming is performed on both ends of a thin, board-like base material during transfer by the grip forming unit of the forming apparatus.
Figure 6B:
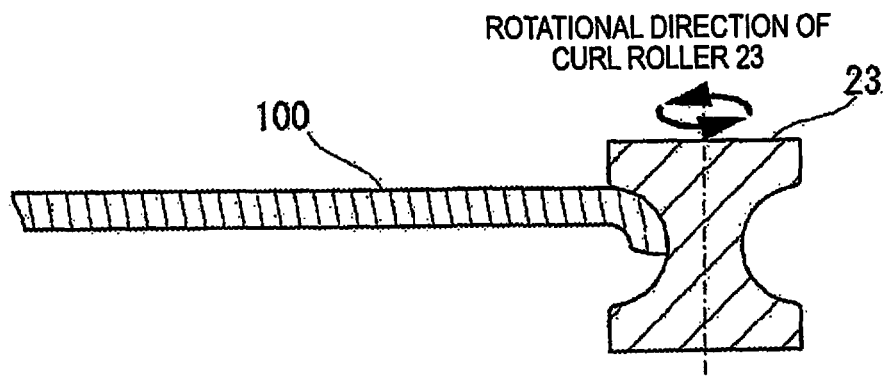
Figure 6C:
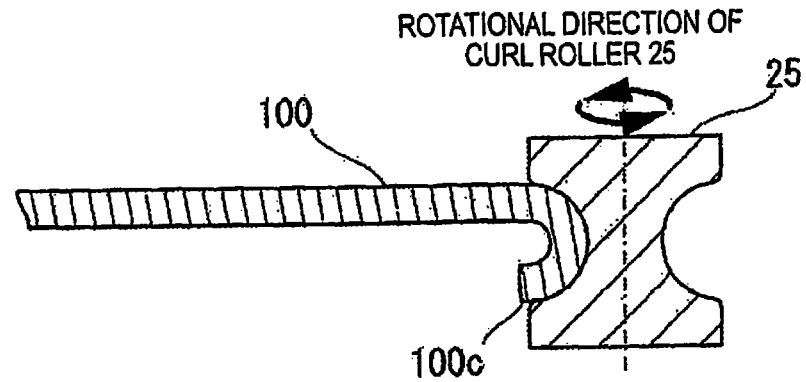
Figure 7A:
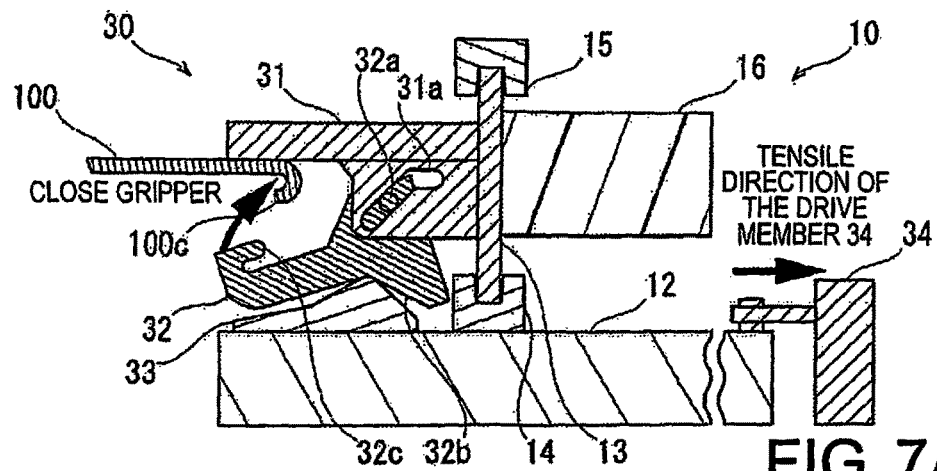
FIGS. 7A and 7B are cross-sectional views corresponding to S12 in FIG. 5, illustrating a state in which both ends of a curl-formed thin, board-like base material are clamped while closing a gripper in the tension unit of the forming apparatus.
Figure 7B:
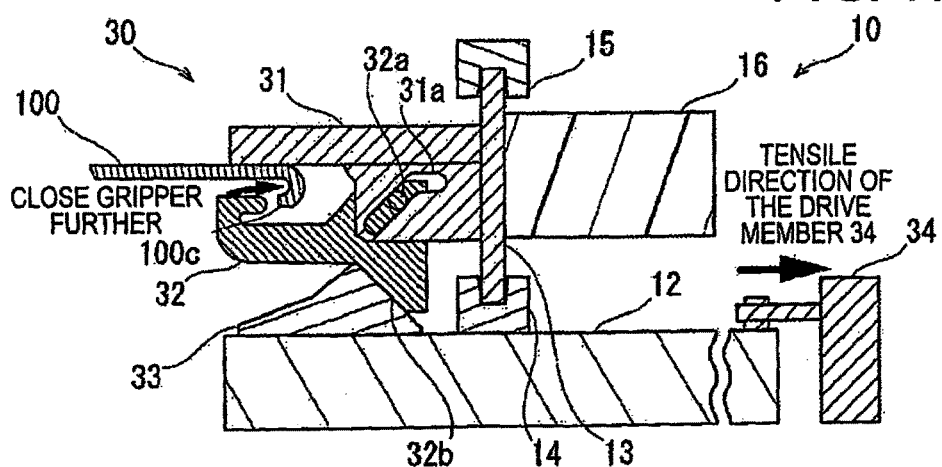
Figure 8:
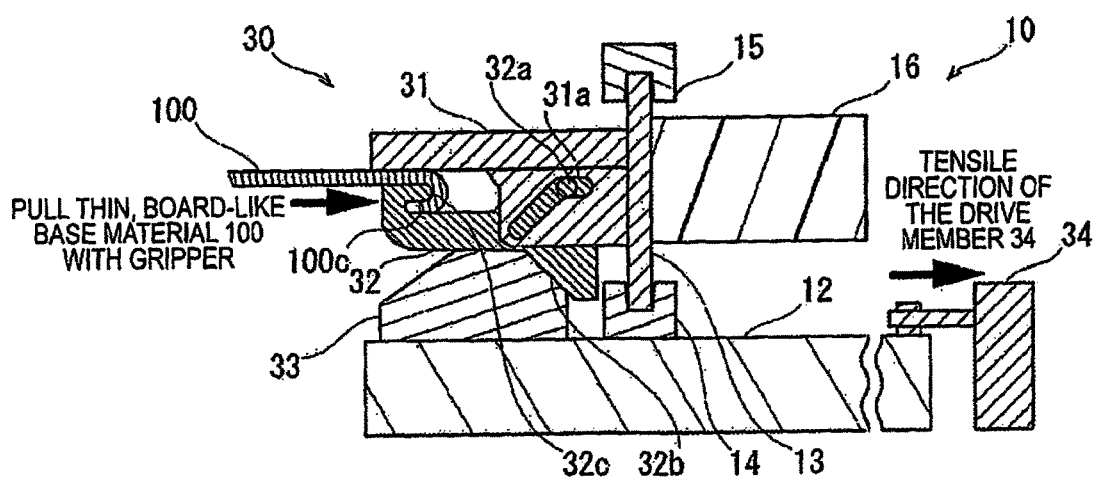
FIG. 8 is a cross-sectional view corresponding to S13 in FIG. 5, illustrating a state in which both ends of a curl-formed thin, board-like base material are pulled outward by a gripper of the tension unit.

FIG. 5 is a flowchart illustrating the operation of forming a thin, board-like base material 100 during transfer using the forming apparatus 1. FIGS. 6A-6C are cross-sectional views corresponding to S11 in FIG. 5, illustrating a state in which curl forming is performed on both ends (one end 100a and the other end 100b) of a thin, board-like base material 100 during transfer by the grip forming unit 20 of the forming apparatus 1. FIGS. 7A and 7B cross-sectional views corresponding to S12 in FIG. 5, illustrating a state in which the grip portions (one end 100c and the other end 100d, which is not shown) of the thin, board-like base material 100 are clamped while closing a gripper in the tension unit 30 of the forming apparatus 1. FIG. 8 is a cross-sectional view corresponding to S13 in FIG. 5, illustrating a state in which the grip portions (one end 100c and the other end 100d, which is not shown) of the thin, board-like base material 100 are pulled outward by the gripper in the tension unit 30. FIGS. 9 and 9B are cross-sectional views corresponding to S15 in FIG. 5, illustrating a state in which the grip portions (one end 100c and the other end 100d, which is not shown) of the thin, board-like base material 100 are released by opening the gripper in the tension unit 30 of the forming apparatus 1.

First, curl forming is performed (S11 in FIG. 5) on both ends (one end 100a and the other end 100b) of the thin, board-like base material 100, using the grip forming unit 20, on the upstream side of the processing area of the thin, board-like base material 100 during transfer, as illustrated in FIG. 6.

FIGS. 6A to 6C correspond to a cross section along the 6A-6A line in FIG. 2B. FIG. 6A illustrates a state immediately before abutting both ends (one end 100a and the other end 100b) of the thin, board-like base material 100 to the curl roller 21 and the curl roller 22, which is not shown, and performing curl forming. FIG. 6B corresponds to a cross section along the 6B-6B line in FIG. 2B. As illustrated in FIG. 6B, both ends (one end 100a and the other end 100b) of the thin, board-like base material 100 are abutted to the curl roller 23 and the curl roller 24, which is not shown, to gradually perform curl forming. FIG. 6C corresponds to a cross section along the 6C-6C line in FIG. 2B. As illustrated in FIG. 6C, forming of the grip portions (one end 100c and the other end 100d, which is not shown) of the thin, board-like base material 100 is completed using the curl roller 25 and the curl roller 26, which is not shown.

Additionally, as illustrated in FIGS. 7A and 7B, the grip portions (one end 100c and the other end 100d, which is not shown) of the thin, board-like base material 100 are held while closing the gripper in the tension unit 30, on the upstream side of the processing area of the thin, board-like base material 100 during transfer. The gripper corresponds to the first grip member 31 and the second grip member 32, which form a pair (S12 in FIG. 5).

FIG. 7A corresponds to a cross section along the 7A-7A line in FIG. 3B. As illustrated in FIG. 7A, clamping of the grip portions (one end 100c and the other end 100d, which is not shown) of the thin, board-like base material 100 is started. FIG. 7B corresponds to a cross section along the 7B-7B line in FIG. 3B. FIG. 7B illustrates a state immediately before the grip portions (one end 100c and the other end 100d, which is not shown) of the thin, board-like base material 100 are clamped. That is, since the guide member 33 of the tension unit 30 is continuously raised along the transfer direction of the thin, board-like base material 100, the second grip member 32 gradually moves closer to the first grip member 31, and the first grip member 31 and the second grip member 32 hold the thin, board-like base material 100.

Additionally, as illustrated in FIG. 8, the grip portions (one end 100c and the other end 100d, which is not shown) of the thin, board-like base material 100 are pulled outward by the gripper of the tension unit 30, on the upstream side of the processing area of the thin, board-like base material 100 during transfer (S13 in FIG. 5).

FIG. 8 corresponds to a cross section along the 8-8 line in FIG. 3B. That is, since the guide member 33 of the tension unit 30 is continuously projected outward from the thin, board-like base material 100, perpendicular to the transfer direction of the thin, board-like base material 100, the projection 32c of the second grip member 32 will be pressed against the first grip member 31 via the thin, board-like base material 100. At this time, the projection 32c of the second grip member 32 will be in a state of holding and pulling the grip portions (one end 100c and the other end 100d, which is not shown) of the thin, board-like base material 100.

Furthermore, irregularities, through-holes, etc., are formed on the thin, board-like base material 100 in the processing area of the thin, board-like base material 100, using the press machine 41 of the forming unit 40 while transferring the thin, board-like base material 100 (S14 in FIG. 5).

Locating holes 100e for positioning, an irregular flow path 100f in the active area, and manifold holes 100g, which supply and discharge gas and cooling water, are formed on the thin, board-like base material 100 using the press machine 41, as illustrated in FIG. 1. Then, the portion that becomes the separator is punched to open punching holes 100h.

Figure 9A:
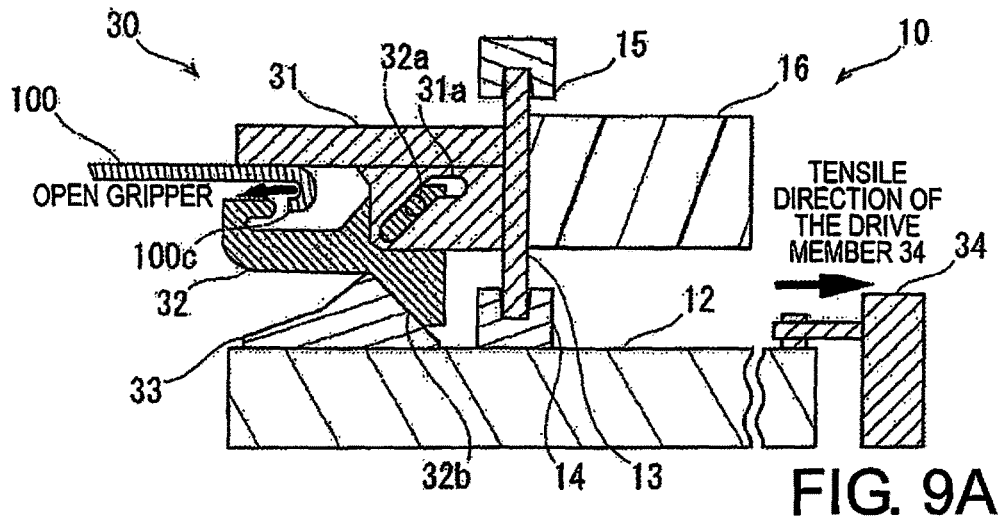
FIGS. 9A and 9B are cross-sectional views corresponding to S15 in FIG. 5, illustrating a state in which both ends of the thin, board-like base material are released by opening the gripper in the tension unit of the forming apparatus.
Figure 9B:
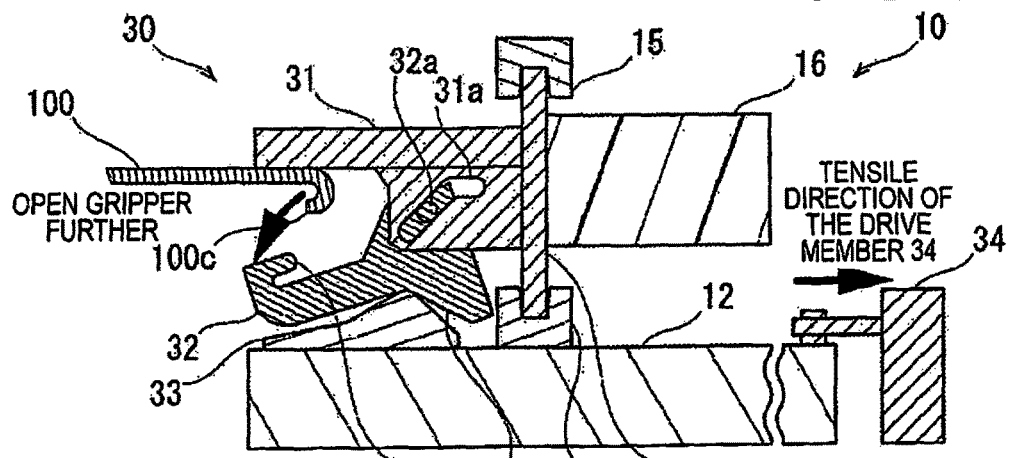

Also, as illustrated in FIGS. 9A and 9B, the grip portions (one end 100c and the other end 100d, which is not shown) of the thin, board-like base material 100 are released by opening the gripper on the downstream side of the processing area of the thin, board-like base material 100 during transfer (S15 in FIG. 5).

As illustrated in FIG. 9A, the grip portions (one end 100c and the other end 100d, which is not shown) of the thin, board-like base material 100 start to be released. FIG. 9B illustrates a state immediately after the grip portions (one end 100c and the other end 100d, which is not shown) of the thin, board-like base material 100 are released. That is, since the guide member 33 of the tension unit 30 is continuously retracted inward of the thin, board-like base material 100, perpendicular to the transfer direction of the thin, board-like base material 100, the projection 32c of the second grip member 32 will be separated from the first grip member 31. At this time, the projection 32c of the second grip member 32 will be in a state of releasing the grip portions (one end 100c and the other end 100d, which is not shown) of the thin, board-like base material 100.

The steps according to S11-S15 in FIG. 5 are continued as long as there are unprocessed portions in the processing area of the thin, board-like base material 100, based on the control of the controller 51 of the control unit 50 (S16 in FIG. 5).

According to the method of forming the thin, board-like base material 100 according to the first embodiment and the forming apparatus 1 embodying the forming method described above, the following actions and effects can be achieved.

The method of forming the thin, board-like base material 100 according to the first embodiment has a grip forming step, a tensile transfer step, and a forming step. In the grip forming step, grip portions (one end 100c and the other end 100d) are formed by processing both of the two ends of the thin, board-like base material 100 along the transfer direction. In the tensile transfer step, the long thin, board-like base material 100 is transferred by pulling the thin, board-like base material 100 in the transfer direction, while holding both ends of the thin, board-like base material along the transfer direction and pulling the ends outward in the direction intersecting the transfer direction. In the forming step, predetermined forming operations are performed with respect to the thin, board-like base material 100.

The forming apparatus 1 of the thin, board-like base material 100 according to the first embodiment comprises a grip forming unit 20, a tension unit 30, a transfer unit 10, a forming unit 40, and a control unit 50. The grip forming unit 20 forms the grip portions (one end 100c and the other end 100d) by processing both ends of the thin, board-like base material 100 along the transfer direction. The tension unit 30 holds the grip portions (one end 100c and the other end 100d) on both ends of the long, thin, board-like base material 100 along the transfer direction with a first grip member 31 and a second grip member 32 and pulls the thin, board-like base material outward in the direction intersecting the transfer direction. The transfer unit 10 transfers the thin, board-like base material, which is in a state of being pulled outward in the direction intersecting the transfer direction by the tension unit 30, by pulling the thin, board-like base material 100 in the transfer direction. The forming unit 40 performs predetermined forming operations with respect to the thin, board-like base material 100. The control unit 50 controls the operation of the grip forming unit 20, the tension unit 30, the transfer unit 10, and the forming unit 40.

According to the forming method and the forming apparatus 1 of the thin, board-like base material 100 configured in this way, the thin, board-like base material 100 is transferred by pulling the thin, board-like base material 100 in the transfer direction while holding the grip portions (one end 100c and the other end 100d) formed on both ends of the long, thin, board-like base material 100 along the transfer direction and pulling the ends outward in the direction intersecting the transfer direction. According to this type of forming method and forming apparatus 1 of the thin, board-like base material 100, transferring and forming the thin, board-like base material 100 at a high speed without distortion is possible by stably holding the thin, board-like base material 100 via the grip portions (one end 100c and the other end 100d). Therefore, according to this forming method and the forming apparatus 1 of the thin, board-like base material 100, the time needed to process a thin, board-like base material 100 can be shortened while sufficiently maintaining the forming accuracy of the thin, board-like base material 100; additionally, productivity related to the formation of the thin, board-like base material 100 can be improved. Here, due to the grip forming step and the grip forming unit 20, the transfer of the thin, board-like base material 100 does not need to be stopped when forming both ends of the thin, board-like base material 100.

The grip forming step and the grip forming unit 20 may also be configured to form grip portions (one end 100c and the other end 100*d*) by bending or folding both ends of the thin, board-like base material 100 along the transfer direction.

According to this type of configuration, the thin, board-like base material 100 can be pulled in a stably held state with an extremely simple method by using the grip portions (one end 100*c* and the other end 100*d*) that are formed on both ends of the thin, board-like base material 100. In the thin, board-like base material 100, the portions where the grip portions (one end 100*c* and the other end 100*d*) are formed are portions that would have been discarded after forming; as a result, forming loss will not occur in the thin, board-like base material 100.

Furthermore, the tensile transfer step and the tension unit 30 may be configured to move the first grip member 31 and the second grip member 32 outward in a direction intersecting the transfer direction via biasing with a guide member 33 provided along the transfer direction.

According to this type of configuration, the thin, board-like base material 100 can be pulled outward in a direction intersecting the transfer direction with a simple configuration, using only a guide member 33 consisting a mechanical member, without using an electrical mechanism.

In the case of such a configuration, a drive member 34 consisting of, for example, a hydraulic cylinder disposed on the mounting table 11 is not necessary.

Second Embodiment

The method of forming the thin, board-like base material 100 according to the second embodiment and the forming apparatus 2 of the thin, board-like base material 100 embodying the forming method will be explained with reference to FIG. 10 to FIGS. 11A and 11B.

The forming apparatus 2 according to the second embodiment differs from the configuration of the forming apparatus 1 according to the first embodiment described above in the configuration for clamping both ends (one end 100*a* and the other end 100*b*) of the thin, board-like base material 100, which have not been curl formed, using a tension unit 60.

In the second embodiment, the same reference codes have been used for the same configurations as the first embodiment described above, and the explanations thereof have been omitted.

The forming apparatus 2 comprises a tension unit 60 in addition to the transfer unit 10 and the control unit 50 described above. The configurations of the tension unit 60 that are particular to the forming apparatus 2 will be explained below with reference to FIG. 10 and FIG.

Figure 10:
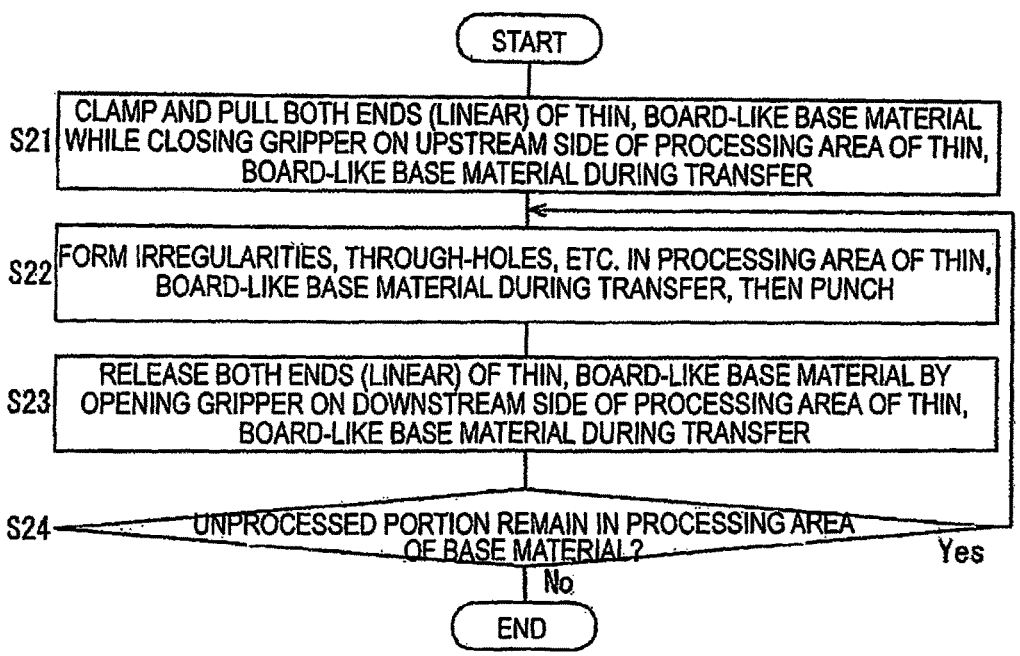
FIG. 10 is a flowchart illustrating an operation of processing a thin, board-like base material during transfer using the forming apparatus according to a second embodiment.
Figure 11A:
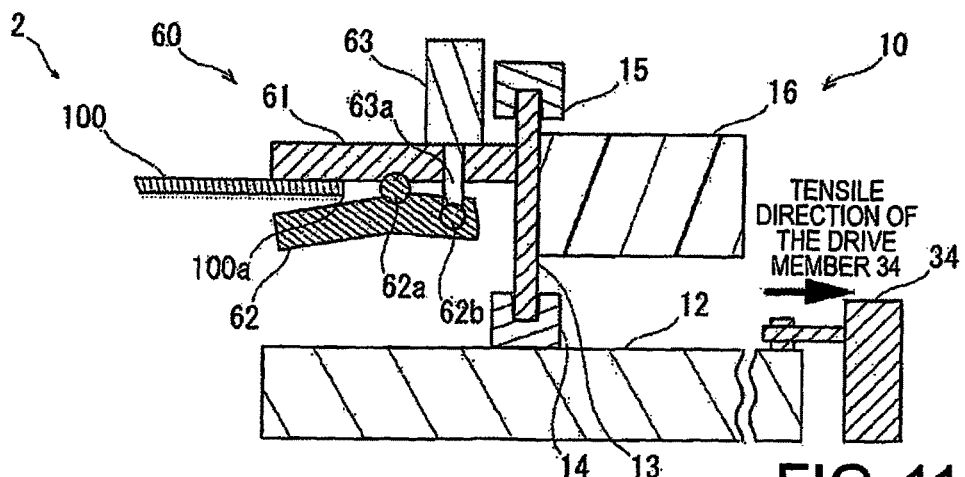
FIGS. 11A and 11B are cross-sectional views corresponding to S21 in FIG. 10, illustrating a state in which both ends of a thin, board-like base material that have not been curl formed are clamped while closing a gripper in the tension unit of the forming apparatus.
Figure 11B:
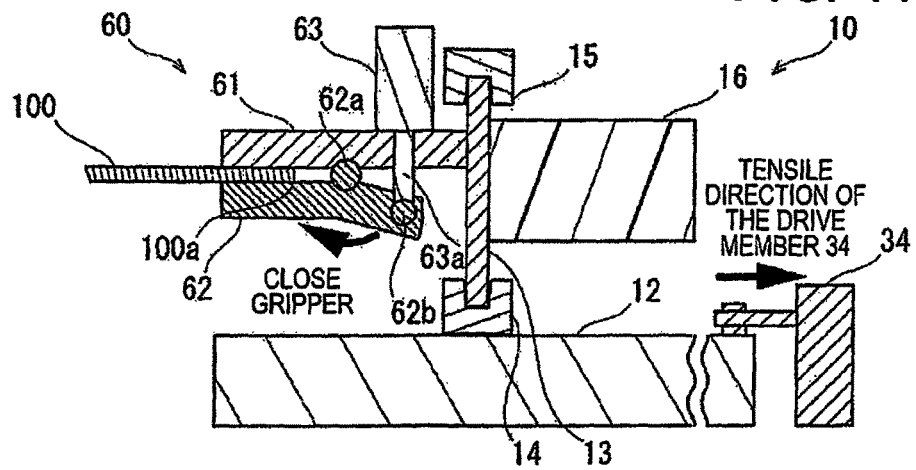

FIG. 10 is a flowchart illustrating the operation of processing a thin, board-like base material 100 during transfer using the forming apparatus 2. FIGS. 11A and 11B are cross-sectional views corresponding to S21 in FIG. 10, illustrating a state in which both ends (one end 100*a* and the other end 100*b*) of a thin, board-like base material 100 that have not been curl formed are clamped while closing a gripper in the tension unit 60 of the forming apparatus 2.

The tension unit 60 holds both ends (one end 100*a* and the other end 100*b*, which is not shown) of the long, thin, board-like base material 100 along the transfer direction with a first grip member 61 and a second grip member 62 and pulls the thin, board-like base material outward in the direction intersecting the transfer direction.

The tension unit 60 comprises a first grip member 61, a second grip member 62, a turning member 63, and the previously mentioned drive member 34, as illustrated in FIGS. 11A and 11B. The first grip member 61 and the second grip member 62, when paired, hold the ends (one end 100*a* and the other end 100*b*, which is not shown) of the thin, board-like base material 100 during transfer, as illustrated in FIG. 11B. A plurality of first grip members 61 and second grip members 62 are joined at set intervals with respect to the outer peripheral surface of the transfer belt 13 of the transfer unit 10. The first grip member 61 and the second grip member 62 are positioned along both ends of the thin, board-like base material 100 in the transfer direction. The first grip member 61 is positioned relatively upward, and the second grip member 62 is positioned relatively downward at both ends of the thin, board-like base material 100 in the transfer direction, which is transferred in a horizontal state.

The first grip member 61 forms a pair with the second grip member 62 and holds both ends (one end 100*a* and the other end 100*b*, which is not shown) of the thin, board-like base material 100 during transfer, as illustrated in FIGS. 11A and 11B. The first grip member 61 is made of, for example, metal and is formed in a plate shape. The plate-like first grip member 61 is joined so as to be perpendicular to the transfer belt 13. A rotating portion 62*a* of the second grip member 62 is rotatably held below the first grip member 61. The turning member 63 is joined above the first grip member 61.

The second grip member 62 forms a pair with the first grip member 61 and holds both ends (one end 100*a* and the other end 100*b*, which is not shown) of the thin, board-like base material 100 during transfer, as illustrated in FIGS. 11A and 11B. The second grip member 62 is made of, for example, metal and is formed in a plate shape whose central portion has been bent. The second grip member 62 comprises a long rotating portion 62*a* comprising a cylindrical shape in the upper central portion. The rotating portion 62*a* is rotatably attached below the first grip member 61 so that the longitudinal direction follows the transfer direction of the thin, board-like base material 100. A connecting portion 62*b* provided to one end of the second grip member 62 is connected to the turning main body member 63. Of the two ends of the second grip member, the connecting portion 62*b* is provided to the one end that does not clamp the thin, board-like base material 100.

The turning member 63 rotationally drives the second grip member 62 and causes the second grip member 62 and the second grip member 61 to hold the thin, board-like base material 100, as illustrated in FIGS. 11A and 11B. The turning member is configured from, for example, an actuator. An electric, hydraulic, or pneumatic specification can be applied to the actuator. The turning member 63 is coupled to the top of the first grip member 61. An extendable portion 63*a* of the turning member 63 is coupled with the connecting portion 62*b* of the second grip member 62 via a through-hole of the first grip member 61. When the extendable portion 63*a* of the turning member 63 is extended, the distal end of the second grip member 62 approaches the first grip member 61, with the second grip member 62 being rotated in one direction about the rotating portion 62*a*, to hold the end of the thin, board-like base material 100. On the other hand, when the extendable portion 63*a* of the turning member 63 is retracted, the distal end of the second grip member 62 separates from the first grip member 61, with the second grip member 62 being rotated in the other direction about the rotating portion 62*a*, to release the end of the thin, board-like base material 100.

Next, the method of forming the thin, board-like base material 100 using the forming apparatus 2 will be explained, with reference to FIGS. 11A and 11B.

FIG. 10 is a flowchart illustrating the operation of processing a thin, board-like base material 100 during transfer using the forming apparatus 2. FIGS. 11A and 11B are cross-sectional views corresponding to S21 in FIG. 10, illustrating a state in which both ends (one end 100a and the other end 100b) of a thin, board-like base material 100 that have not been curl formed are clamped while closing a gripper in the tension unit 60 of the forming apparatus 2.

First, as illustrated in FIGS. 11A and 11B, both ends (one end 100a and the other end 100b, which is not shown) of the thin, board-like base material 100 are clamped while closing the gripper in the tension unit 60, on the upstream side of the processing area of the thin, board-like base material 100 during transfer, and are pulled outward. The gripper corresponds to the first grip member 61 and the second grip member 62. As illustrated in FIG. 11A, clamping of the grip portions (one end 100c and the other end 100d) of the thin, board-like base material 100 is started. FIG. 11B illustrates a state immediately after the grip portions (one end 100c and the other end 100d) of the thin, board-like base material 100 are clamped. In the state illustrated in FIG. 11B, the reference table 12 is pulled in a direction perpendicular to the transfer direction of the thin, board-like base material 100, outward and away from the thin, board-like base material 100, using the drive members 34 (S21 in FIG. 10).

Furthermore, irregularities, through-holes, etc. are formed on the thin, board-like base material 100 in the processing area of the thin, board-like base material 100 while transferring the thin, board-like base material 100. The formation of irregularities, through-holes, etc. is the same as that illustrated in S14 in FIG. 5 (S22 in FIG. 10).

In addition, both ends (one end 100a and the other end 100b) of the thin, board-like base material 100 are released by opening the gripper on the downstream side of the processing area of the thin, board-like base material 100 during transfer (S23 in FIG. 10).

The steps according to S21-S23 in FIG. 10 are continued as long as there are unprocessed portions in the processing area of the thin, board-like base material 100, based on the control of the controller 51 of the control unit 50 (S24 in FIG. 10).

According to the method of forming the thin, board-like base material 100 according to the second embodiment and the forming apparatus 2 embodying the forming method described above, the following actions and effects can be achieved.

The method of forming the thin, board-like base material 100 according to the second embodiment has a tensile transfer step and a forming step. In the tensile transfer step, the long, thin, board-like base material 100 is transferred by pulling the thin, board-like base material 100 in the transfer direction while holding both ends of the thin, board-like base material along the transfer direction and pulling the ends outward in the direction intersecting the transfer direction. In the forming step, predetermined forming operations are performed with respect to the thin, board-like base material 100.

The forming apparatus 2 of the thin, board-like base material 100 according to the second embodiment comprises a tension unit 60, a transfer unit 10, a forming unit 40, and a control unit 50. The tension unit 60 holds both ends of the long, thin, board-like base material 100 along the transfer direction with a first grip portion 61 and a second grip portion 62 and pulls the thin, board-like base material outward in the direction intersecting the transfer direction. The transfer unit 10 transfers the thin, board-like base material 100, which is in a state of being pulled outward in the direction intersecting the transfer direction by the tension unit 60, by pulling the thin, board-like base material 100 in the transfer direction. The forming unit 40 performs predetermined forming operations with respect to the thin, board-like base material 100. The control unit 50 controls the operation of the tension unit 60, the transfer unit 10, and the forming unit 40.

According to the forming method and the forming apparatus 2 of the thin, board-like base material 100 configured in this way, the thin, board-like base material 100 is transferred by pulling the thin, board-like base material 100 in the transfer direction while holding both ends (one end 100a and the other end 100b) of the long, thin, board-like base material 100 along the transfer direction and pulling the ends outward in the direction intersecting the transfer direction. According to this type of forming method and forming apparatus 2 of the thin, board-like base material 100, transferring and forming the thin, board-like base material 100 at a high speed without distortion is possible. Therefore, according to this forming method and the forming apparatus 2 of the thin, board-like base material 100, the time needed to process a thin, board-like base material 100 can be shortened while maintaining the forming accuracy of the thin, board-like base material 100; additionally, the productivity related to the formation of the thin, board-like base material 100 can be improved.

In addition to the above, various modifications to the present invention based on the configurations described in the Claims are possible and also belong within the scope of the present invention.

For example, the first embodiment was explained as having a configuration in which grip portions are formed by bending both ends of the thin, board-like base material 100 along the transfer direction with the grip forming unit 20. However, the present invention is not limited to this type of configuration; for example, a plurality of through-holes may be formed with respect to both ends of the thin, board-like base material 100 at set intervals so that the two ends along the transfer direction are easy to hold. Similarly, fine irregular marks may be formed with respect to both ends of the thin, board-like base material 100 so that the two ends along the transfer direction are easy to hold.

The invention claimed is:

1. A method of forming a thin, board-like base material, comprising:
   transferring, by a tensile transfer, a long, thin, board-like base material by pulling the thin, board-like base material in a transfer direction while holding both ends of the thin, board-like base material along a transfer direction and pulling the ends outward in a direction intersecting the transfer direction;
   performing predetermined forming operations with respect to the thin, board-like base material; and
   forming curled grip portions by processing both of the ends of the thin, board-like base material during transfer along the transfer direction, wherein
   in the transferring by tensile transfer, the grip portions of the thin, board-like base material are held and pulled outward in a direction intersecting the transfer direction by oppositely disposed gripping members that move in the transfer direction while gripping the thin, board-like base material,
   the transferring, performing and forming steps being performed on a same table of a forming apparatus.

2. The method of forming a thin, board-like base material according to claim 1, wherein, in the grip forming, both ends of the thin, board-like base material along the transfer direction are bent or folded to form the grip portions.

* * * * *